United States Patent Office 3,591,566
Patented July 6, 1971

3,591,566
BETA LACTONE POLYMERIZATION PROCESS WITH HETEROCYCLIC CATALYSTS
Klaas Ruyter and Johan van Olmen, Amsterdam, Netherlands, assignors to Shell Oil Company, New York, N.Y.
No Drawing. Filed Dec. 20, 1968, Ser. No. 785,766
Claims priority, application Great Britain, Jan. 8, 1968, 1,053/68
Int. Cl. C08g *17/017*
U.S. Cl. 260—78.3                8 Claims

ABSTRACT OF THE DISCLOSURE

An improved process for bulk polymerization of one or more betapropiolactones, at least 50% mole being pivalolactone, in the presence of organic heterocyclic initiators, wherein the heteroatom is from the group comprising phosphorous, arsenic, antimony, sulfur, selenium or tellurium, or in the presence of "onium" addition compounds of such initiators.

BACKGROUND OF THE INVENTION

This invention relates to an improved process for the bulk polymerization of one or more β-propiolactones, at least 50% mole thereof being pivalolactone ($\alpha,\alpha$-dimethyl-β-propiolactone), in particular to the homopolymerization of pivalolactone, as well as to the polyesters thus obtained.

It is known that betalactones containing a tertiary or quaternary alpha-carbon atom can be polymerized in bulk in the presence of suitable catalysts to form linear polyesters having high molecular weight. See, for example, British Pat. 1,028,928.

Bulk polymerization of beta lactones and particularly pivololactone is preferred over other processes because after the polymerization reaction, no inert material has to be removed in order to isolate the polymer. Moreover, additives can be conveniently added to the monomer before polymerization, thus avoiding tedious mixing of these additives with the polymer.

The lactone monomers are generally unstable and tend to polymerize during storage and transport, especially at elevated temperatures, to form less desirable polymers of low molecular weight. Accordingly the monomers can be stabilized with certain nitrated phenols, e.g. picric acid, but more preferably with a polymerization inhibitor which is an adduct of boron trifluoride and a Lewis base, as disclosed in U.S. Patent application Ser. No. 593,632, filed Nov. 14, 1966, now U.S. Pat. No. 3,448,122. The Lewis base component of said inhibitor for polymerization includes heterocyclic organic compounds of nitrogen and phosphorous.

It is also known that a number of anionic catalysts are useful for polymerization of beta-lactones, for example phosphines, stibines, sulfides and sulfoxides.

Surprisingly, it has now been discovered that certain heterocyclic initiators are especially advantageous over non-cyclic ones resulting in higher molecular weight polymers and a shorter reaction time.

SUMMARY OF THE INVENTION

This invention provides an improved bulk polymerization process whereby high molecular weight polyesters are produced in a short reaction time and is especially well suited to a continuous polymerization process as, for example, in a gear pump. More particularly, this invention provides an improved process for the bulk polymerization of one or more beta-propiolactones, at least 50% mole thereof being pivololactone, in the presence of an organic heterocyclic initiator, at a temperature between 0° and 280° C. and a catalyst concentration between 0.001 and 5% mole, based on the monomers.

DESCRIPTION OF THE PREFERRED EMBODIMENTS

The process of the instant invention is particularly applicable for the polymerization of beta-lactones wherein the hydrogens of the beta propiolactones having a tertiary or quaternary alpha-carbon atom are especially preferred. Excellent polymers are those prepared from alpha,alpha-dialkyl-beta-propiolactone wherein the alkyl groups contain from 1 to 4 carbon atoms. Suitable examples include alpha,alpha - dimethyl - beta-propiolactone, alpha-methyl-alpha - ethyl-beta-propiolactone, alpha - methyl-alpha-isopropoly-beta-propiolactone, alpha-ethyl - alpha-tert-butyl-propiolactone, alpha,alpha-diisopropyl-propiolactone, etc. Very good results were obtained in the homopolymerization of alpha,alpha-dimethyl-beta-propiolactone (pivalolactone).

The polyester which is the product of the present process is a linear polymer having recurring ester structural units mainly of the formula:

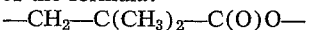
$$-CH_2-C(CH_3)_2-C(O)O-$$

i.e., units derived from pivalolactone. Preferably the polyester is a pivalolactone homopolymer. Within the scope of the present invention, however, the copolymerization of pivalolactone with not more than 50 mole percent, preferably not more than 10 mole percent of other beta-propiolactones, such as beta-propiolactone, alpha,alpha-diethyl-beta-propiolactone and alpha-methyl-alpha-ethyl-beta-propiolactone, is most preferred.

According to the instant process, the polymerization in bulk of the beta-lactones is carried out in the presence of an organic heterocyclic initiator free of active hydrogen and containing in the ring a trivalent atom of a Group V–A or a di- or tetravalent atom of a Group VI–A element, which atom has an atomic number between 15 and 52 and is bound to carbon atoms, with the proviso that in the case of a tetravalent atom of a Group VI–A element the atom is additionally doubly bonded to an oxygen atom, or "onium" addition compounds of such initiators.

Thus the catalyst contains an atom of the elements phosphorus, arsenic, antimony, sulfur, selenium or tellurium. Examples of suitable initiators are tetrahydrothiophene, tetrahydroselenophene, thietane, 1-phenylphospholane, 1,4-dithiane, pentamethylene sulfide, tetramethylene sulfoxide, triethylenediphosphine, 1,4 - diphenyl-diethylenediphosphine, 1 - phenylphosphorinane, 3,6-dimethyl-1-phenyl - phosphepane, 9 - phenyl-9-phosphabicyclo[4.2.1]nonane and 9 - butyl-9-phosphabicyclo[3.3.1]nonane. Examples of "onium" addition compounds of such initiators are 1,4-diethyl - 1,4-diphenyldiethylenediphosphonium dibromide, S,S' - endoethylene-1,4-dithianedisulfonium dichloride and ethylene bis(3 - methyltetramethylenesulfonium bromide. Addition compounds containing in the ring an atom of a Group V–A element, are, therefore, quaternary phosphonium, arsonium and stibonium oxides or salts thereof. Addition compounds containing in the ring an atom of a Group VI–A element, are the tertiary sulfonium, selenonium and telluronium oxides or salts thereof. Preferred catalysts are those containing in the ring a trivalent phosphorus atom or a divalent sulfur atom. It is desirable that the rings do not contain unsaturation, especially of an aromatic nature; preferably the rings are saturated.

The amounts of catalyst to be used may vary within relatively wide limits. Amounts of 0.001 to 5% mole calculated on the monomers are suitable, amounts between 0.01 and 1% mole being preferred.

In this specification polymerization in bulk is understood to be polymerization of the monomer in the absence of more than 10% by weight of solvents or other inert liquid diluents. Normally, solvents or inert liquid diluents will be altogether absent, although small amounts of solvent can be tolerated as, for example, when used for metering the catalyst.

The lactone and the liquid diluent, if employed, preferably contain less than 50 parts per million (by weight) of water and other protonic agents. This may be achieved by such means as azeotropic distillation, or by treatment with desiccating agents such as calcium hydride or toluene diisocyanate. After such treatment it will usually be desirable to redistill the lactone. Various additives which are inert towards the polymerization mixture can be incorporated in the monomer. Examples of such additives are pigments, dyes, fillers, heat stabilizers (e.g. trinonylphenyl phosphite, tetra methyl thiuram disulfide), antioxidants, ultra-violet light stabilizers, antistatic agents and the like.

The temperature at which the polymerization takes place will mostly be between −100 and 350° C. preferably between 0° and 280° C. when the polymerization is carried out in a continuous process, temperatures near the melting point of the polymer will be necessary. The polymer obtained from alpha,alpha-dimethyl propiolactone, for example, has a melting point in the range of from 240 to 250° C. However, excessive exposure to those higher temperatures should be minimized to avoid decomposition of the monomer and/or polymer.

The polyesters obtained according to the invention are useful thermoplastics which can be shaped by known methods such as, for example melt spinning, extrusions, injection molding, blow molding into fibers, threads, films, sheets, profiles, solid moldings, bottles, toys and the like.

The following examples are presented in order to illustrate the process of the invention. Limiting Viscosity Number (LVN) is a measure of molecular weight and increases as molecular weight increases. The LVN was measured in an 0.5% by weight solution of the polyester in benzylalcohol at 150° C.

EXAMPLE I

Pivalolactone was dried to a water content of less than 30 parts per million by azeotropic distillation with xylene. The dried lactone was subsequently distilled at reduced pressure. To this freshly distilled lactone was added a catalyst according to the invention i.e. a mixture of 9-eicosyl-9-phospha [4.2.1]-and-[3.3.1] bicyclononanes (EPBN). The polymerization was carried out in bulk by stirring the mixture of pivalolactone and catalyst at 50° C. For comparison purposes, the procedure was repeated under the same conditions, with a catalyst from the prior art, vis: tributyl phosphine (TBN). Results were as follows:

| Catalyst | Reaction time, minutes | Conversion, percent | Limiting Viscosity Number, (LVN) dl./g. |
|---|---|---|---|
| 0.01% mole EPBN | 60 | 13 | 1.46 |
| 0.01% mole TBN | 60 | 13 | 1.05 |

EXAMPLE II

Example I is repeated except that the lactone monomer is a mixture of 90% mole pivalolactone and 10% mole alpha-methyl-alpha ethyl beta-propiolactone. Related results are obtained.

EXAMPLE III

Example I is repeated except that the catalyst according to the invention was Tetrahydrothiophene (THTP) and the catalyst of art was dibutyl sulfide DBS. Results were as follows:

| Catalyst | Reaction time, minutes | Conversion, percent | LVN, dl./g. |
|---|---|---|---|
| 0.3% mole THTP | 90 | 21 | 5.0 |
| 0.3% mole DBS | 150 | 21 | 2.6 |

EXAMPLE IV

Example I is repeated except that the catalyst according to the invention is 1,4-diethyl-1,4-diphenyl diethylenediphosphonium dibromide. Related results are obtained.

EXAMPLE V

Example III is repeated except that the catalyst according to the invention is S,S'-endoethylene-1,4-dithiane sulfonium dichloride. Related results are obtained.

We claim as our invention:

1. A process for bulk polymerization of one or more beta-propiolactones selected from the group consisting of beta-propiolactone and alpha-alpha-dialkyl-beta-propiolactones wherein the alkyl groups contain from 1 to 4 carbon atoms, at least 50% mole being pivalolactone, which comprises polymerizing said lactones in the presence of from 0.001 to 5% mole on monomer of an organic heterocyclic initiator free of active hydrogen selected from the group consisting of thietane, tetrahydrothiophene, eicosyl, 9-butyl-9-phosphabicyclo[3.3.1]nonane and S,S'-endoethylene-1,4-dithianedisulfonium dichloride.

2. A process as in claim 1 wherein the beta-lactones are alpha,alpha-dialkyl-beta propiolactones.

3. A process as in claim 2 wherein the polymerization is the homo polymerization of pivalolactone.

4. A process as in claim 1 wherein the temperature is between 0° and 280° C.

5. A process as in claim 1 wherein the initiator concentration is between 0.01 and 1% mole, calculated on the monomers.

6. A process as in claim 1 wherein the lactone, and the liquid diluent, if employed, contain less than 50 parts per million by weight of water and other protonic agents.

7. A process as in claim 1 wherein the initiator is tetrahydrothiophene.

8. A process as in claim 1 wherein the beta-propiolactine is pivalolactone with not more than 10 mole percent of other beta-propiolactones.

References Cited

UNITED STATES PATENTS 3,462,398  8/1969  Wagner et al. _____ 260—78.3

FOREIGN PATENTS 1,016,394  1/1966  Great Britain _____ 260—78.3

WILLIAM H. SHORT, Primary Examiner

E. A. NIELSEN, Assistant Examiner

U.S. Cl. X.R.

260—79

PO-1050
(5/69)

UNITED STATES PATENT OFFICE
CERTIFICATE OF CORRECTION

Patent No. 3,591,566          Dated July 6, 1971

Inventor(s) KLAAS RUYTER and JOHAN VAN OLMEN

It is certified that error appears in the above-identified patent and that said Letters Patent are hereby corrected as shown below:

In claim 1, last 2 lines, which read

"eicosyl, 9-butyl-9-phosphabicyclo [3.3.1] nonane and S,S'-endoethylene-1,4 dithianesulfonium dichloride."

Should read

"9-eicosyl-9-phosphabicyclo [4.2.1] nonane, 9-butyl-9-phosphabicyclo [3.3.1] nonane and S,S'-endoethylene-1,4-dithianedisulfonium dichloride."

Signed and sealed this 11th day of January 1972.

(SEAL)
Attest:

EDWARD M. FLETCHER, JR.        ROBERT GOTTSCHALK
Attesting Officer               Acting Commissioner of Patents